United States Patent [19]
Afshar et al.

[11] Patent Number: 6,106,248
[45] Date of Patent: Aug. 22, 2000

[54] ROTATIONALLY CAST PUMP HOUSING

[75] Inventors: Mohammad R. Afshar, Cary, N.C.;
Eduardo Deocampo, Diamond Bar, Calif.

[73] Assignee: Pac-Fab, Inc., Sanford, N.C.

[21] Appl. No.: 09/189,526

[22] Filed: Nov. 10, 1998

Related U.S. Application Data

[62] Division of application No. 08/733,759, Oct. 18, 1996, abandoned.

[51] Int. Cl.[7] .............................. F04B 17/00; F01D 1/00
[52] U.S. Cl. .................................... 417/423.14; 415/182.1
[58] Field of Search .................. 417/423.14; 415/182.1; 285/363

[56] References Cited

U.S. PATENT DOCUMENTS

| | | | |
|---|---|---|---|
| 3,652,180 | 3/1972 | Choquette et al. | 415/113 |
| 3,876,327 | 4/1975 | Lobanoff | 415/200 |
| 3,932,068 | 1/1976 | Zimmermann | 417/420 |
| 3,967,915 | 7/1976 | Litzenberg | 415/209 |
| 4,157,057 | 6/1979 | Bailey | 417/437 |
| 4,430,214 | 2/1984 | Baker | 210/169 |
| 4,504,535 | 3/1985 | Snyder | 428/137 |
| 4,722,664 | 2/1988 | Wissman | 415/197 |
| 5,160,064 | 11/1992 | LeBlanc | 220/664 |
| 5,171,041 | 12/1992 | McMillan et al. | 285/21 |

*Primary Examiner*—Michael K. Gray
*Attorney, Agent, or Firm*—Pearne & Gordon LLP

[57] ABSTRACT

A rotationally cast molded article, such as a pump housing or a tank liner, is disclosed. The molded article has reinforced access openings which form flanges. The flanges are reinforced by embedded metal plates having an array of threaded metal sleeves which serve to mount the plates in the mold and which serve as threaded connectors for flanged fittings associated with the access openings.

2 Claims, 5 Drawing Sheets

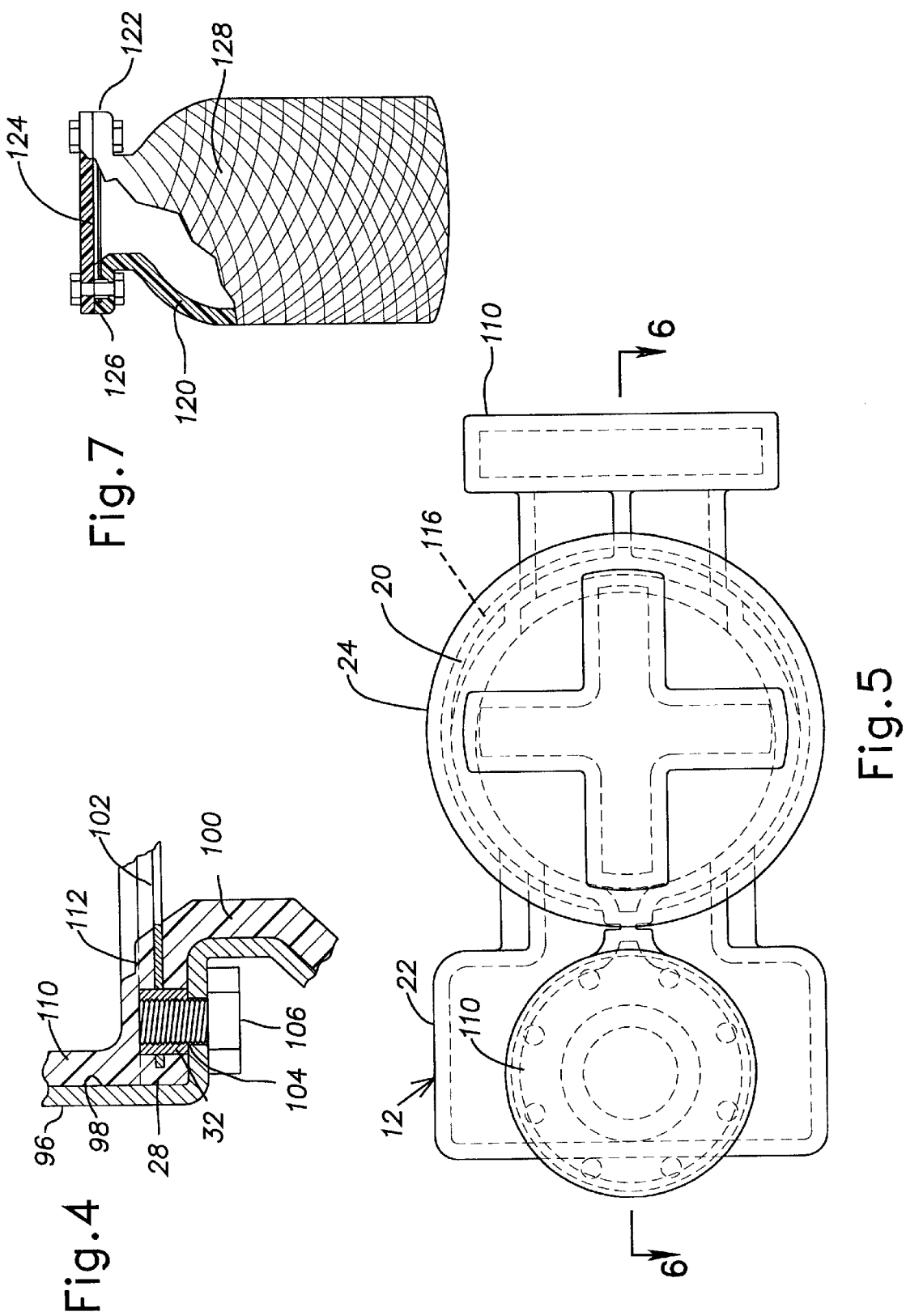

6,106,248

ROTATIONALLY CAST PUMP HOUSING

This is a divisional application of Ser. No. 08/733,759 filed Oct. 18, 1996, now abandoned.

BACKGROUND OF THE INVENTION

This invention relates to rotationally cast molded plastic articles having access openings for the connection of fittings thereto. More particularly this invention relates to non-metallic thermoplastic pump casings having reinforced flange connections and, according to another aspect of this invention, relates to rotationally cast filament-wound tank liners having reinforced access openings.

Presently, non-metallic pumps are made of engineered thermoplastics and are usually molded by an injection molding process. Since the tooling and mold costs for the injection molding of a pump casing are proportional to the size of the pump, injection molding has been used to produce relatively small fractional horsepower pumps. Prohibitive costs are involved in the production of large size pump casings adapted to withstand the hydraulic pressure and the volume of liquid being pumped.

Nevertheless, it is desirable to employ thermoplastic materials in the manufacture of pumps utilized as a horizontal closed coupled pump for swimming pools, waterfalls, K01 ponds, or as liquid transfer pumps. The advantages of using thermoplastic materials in the manufacture of thermoplastic pumps are their chemical resistance to withstand corrosion, toughness, light weight, high dielectric strength, and machinability. Most resins also meet FDA requirements and colors can be molded in.

It would appear that rotational casting techniques would be ideally suited for the production of large capacity pump casings. However, the inherent capability of producing a uniform wall thickness by rotationally casting a pump casing results in flange connections which are too thin to perform their intended purpose. Moreover, relatively thin flange sections tend to move or warp when pressure is applied. It is desirable, therefore, to produce a rotationally molded pump casing having thickened casing flanges which are reinforced to maximize connecting strength and minimize warpage under pressure.

SUMMARY OF THE INVENTION

This invention provides a method which produces a rotationally cast molded article having reinforced access openings. More specifically, the process according to this invention involves the steps of charging a cold mold with a powdered resin and indexing the mold to a heating station or oven where the mold is simultaneously rotated about two perpendicular axes. During this stage, a uniform layer of resin is deposited on the mold cavity. After a sufficient time has elapsed to properly fuse the resin, and while the mold is rotating, the mold is cooled by forced cool air, atomized air-water fog, water spray, or a combination of these techniques. After cooling, the part is removed from the mold.

Since a rotational molding operation produces a uniform wall thickness, a technique is employed to thicken and reinforce those portions of the wall which comprise flange connections surrounding access openings in the wall. To this end, annular metal plates are mounted within the mold cavity prior to the casting operation and in a position spaced inwardly from the mold cavity wall and surrounding the access opening. The plates are spaced from the cavity wall by internally threaded metal sleeves which project in a spaced array normal to the plane of the metal plate. The plates are held in place by bolts which extend through the mold wall and are threaded into the sleeves. During the molding operation, the plates and sleeves act as heat conductors to thicken the wall in the flange areas and, during use of the product, the plates prevent warping of the flange under pressure conditions while the sleeves provide threaded openings for receiving bolted-on fittings.

Thus, according to one aspect of this invention, a rotationally cast pump housing has a wall provided with flanged access openings which are adapted to mate with flanged conduit fittings. The flanged access openings have annular faces provided with a circular array of threaded bolt openings formed by tubular metallic sleeves which are provided on an annular metallic reinforcing plate embedded in a portion of the wall forming the annular flange faces.

According to another aspect of this invention, a pressure vessel has a rotationally cast plastic liner provided with at least one flanged access opening. The flanged access opening is provided with a circular array of threaded bolt openings formed by tubular metallic sleeves which are provided on an annular metallic reinforcing plate embedded in a portion of the wall forming the flanged access opening. The liner may be filament-wound according to conventional winding techniques.

According to a still further aspect of this invention, a method is provided for rotationally molding an article such as a pump housing or a pressure vessel liner. A hollow mold is provided having a mold cavity defining the shape of the article to be molded including the outside surface of at least one access opening having an annular face portion. A metallic reinforcing plate having a plurality of internally threaded sleeves is mounted in the mold cavity so that the plate surrounds the access opening and is spaced from the mold wall by the sleeves. A powdered resinous molding compound is charged in the mold and the mold is rotated about two perpendicular axes of revolution while the mold is heated to coat the mold cavity, the reinforcing plate, and the sleeves. The molded article is cooled and removed from the mold. After the article is removed from the mold, the front section of the flange is removed to expose the flange face. The flange face is then machined for flatness.

BRIEF DESCRIPTION OF THE DRAWINGS

FIG. 4 is an enlarged fragmentary sectional view of a reinforced flange according to this invention, illustrating the flange mounted in the casting mold;

FIG. 5 is a plan view of the molded pump housing prior to removal from the mold, showing portions of the mold;

FIG. 7 is an elevational view of a pressure vessel according to another aspect of this invention with a portion removed to illustrate a reinforced access opening.

DETAILED DESCRIPTION OF THE INVENTION

Figure 1:
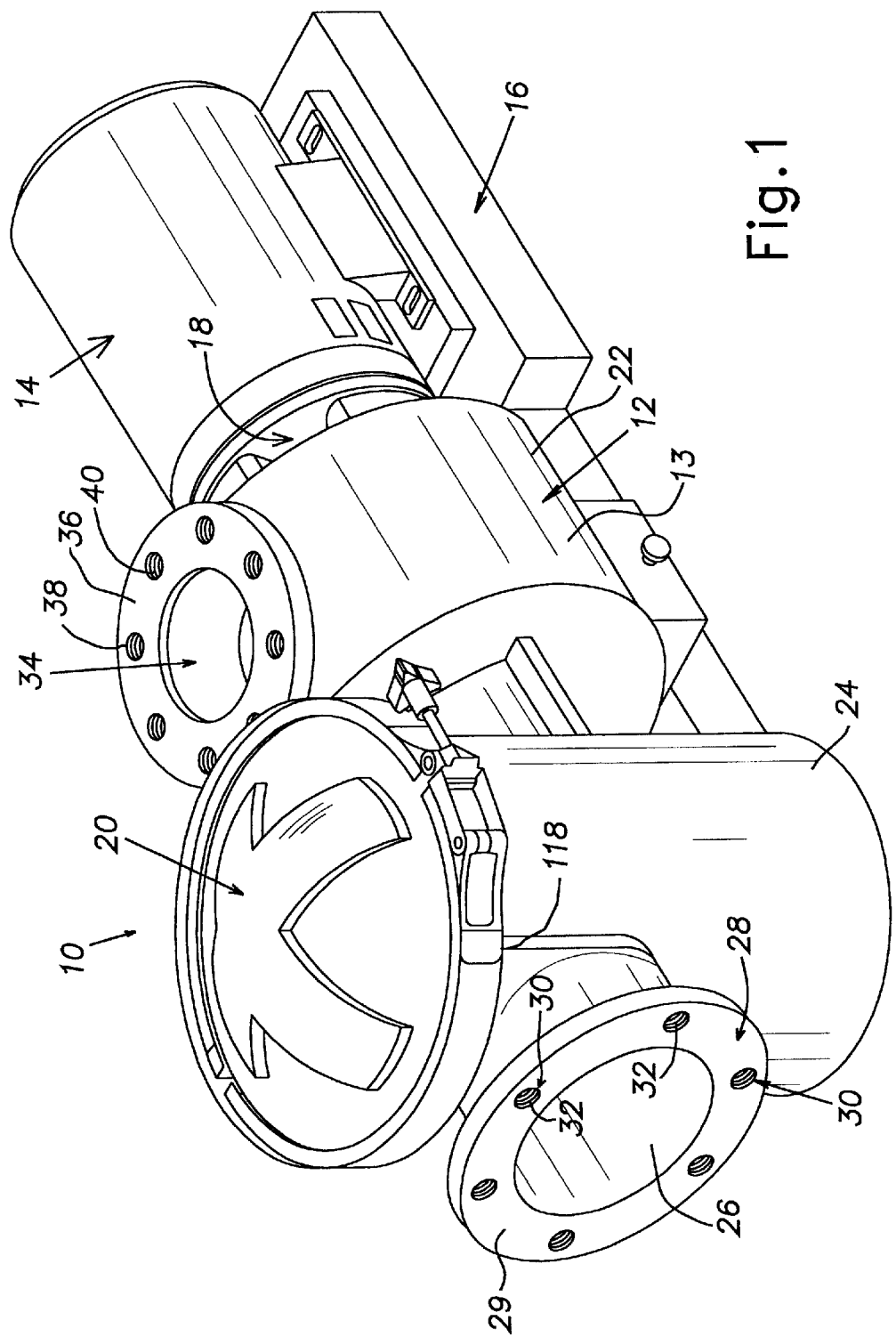
FIG. 1 is a perspective view of a pump having a housing produced in accordance with this invention.
Figure 2:
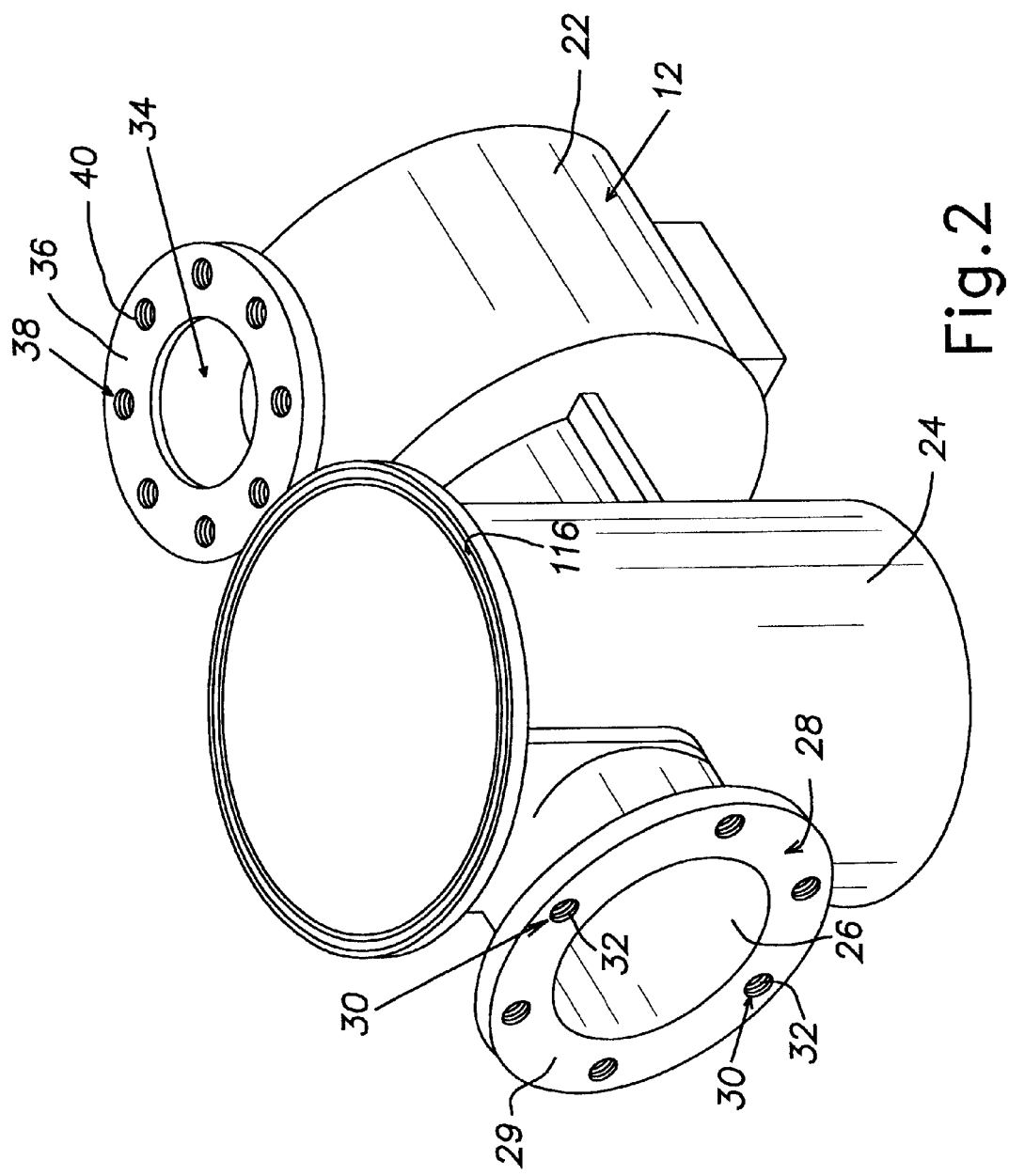
FIG. 2 is a perspective view of the housing illustrated in FIG. 1.

Referring now to the drawings, and particularly to FIGS. 1 and 2, there is illustrated a horizontal closed coupled pump 10. The pump 10 includes a pump casing 12 comprising a rotationally cast unitary casing wall 13, a motor 14 mounted on a support 16, a plate seal 18 and, a pot lid 20. The casing 12 is a one-piece construction and includes an impeller housing 22 and a strainer basket housing 24.

The strainer basket housing 24 is provided with an inlet port opening 26 defined by a reinforced annular flange 28 having a flange face 29 and having a plurality of bolt access openings 30 therethrough. Each bolt access opening 30 is defined by an internally threaded sleeve 32.

Similarly, the impeller housing 22 is provided with an outlet port opening 34 defined by a reinforced annular flange 36 having a plurality of bolt access openings 38 therethrough. Each access opening 38 is defined by an internally threaded sleeve 40.

Figure 3:
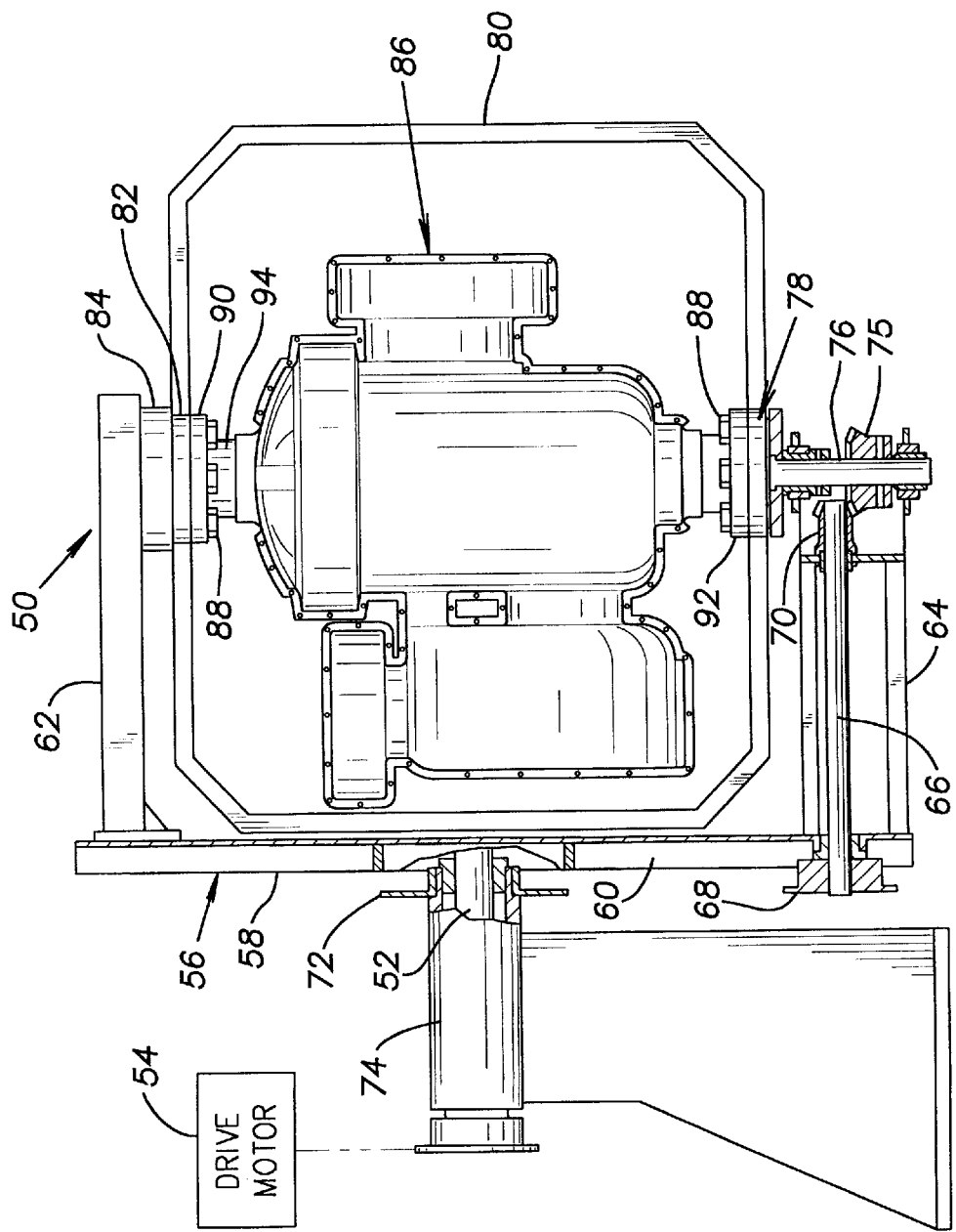
FIG. 3 is an elevational view of a portion of a rotational casting machine having a mold mounted in the casting arm of the machine for producing a plastic pump housing according to this invention.
Figure 6:
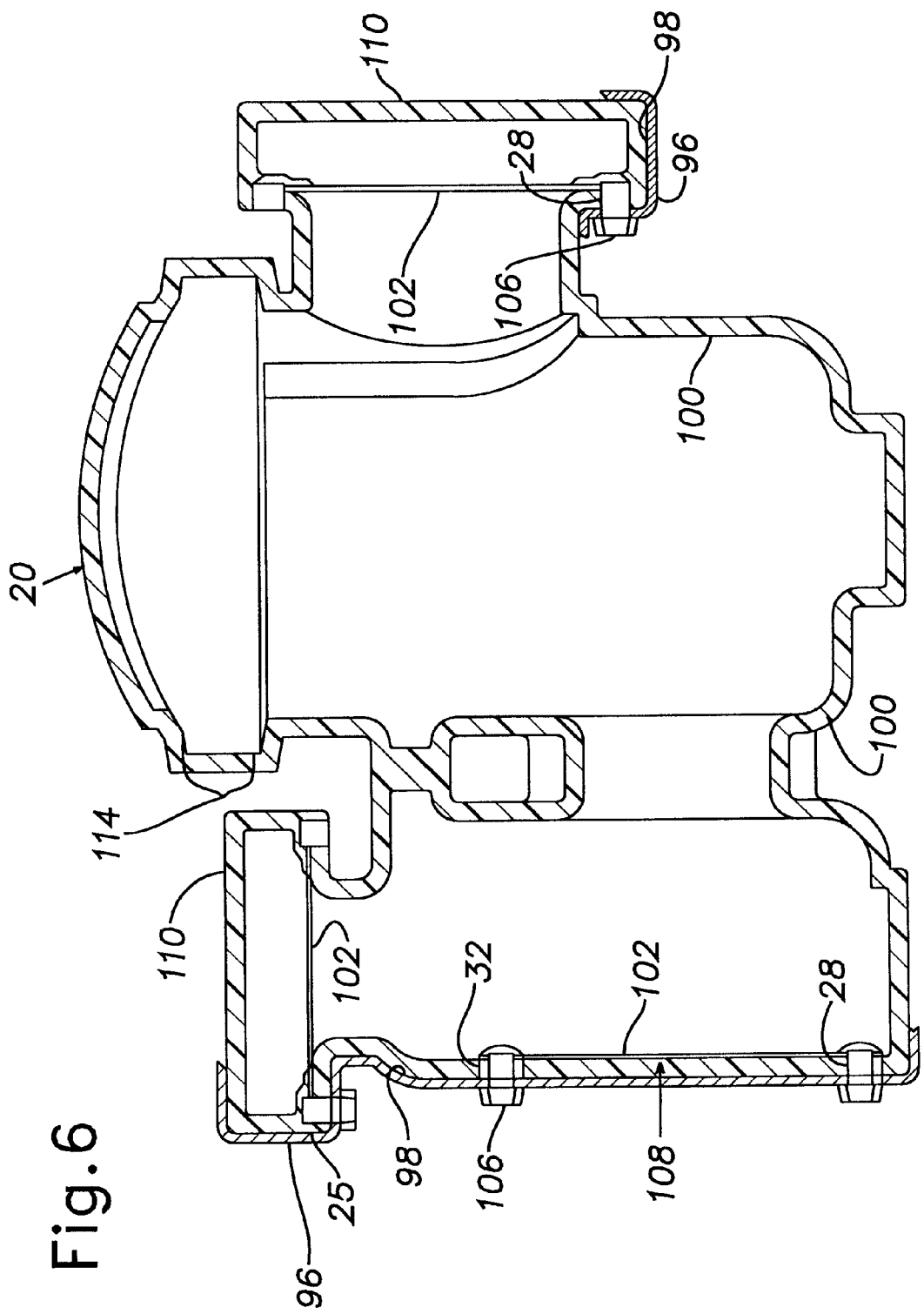
FIG. 6 is a cross-sectional view, the plane of the section being indicated by the line 6—6 in FIG. 5.

Referring now to FIGS. 3, 4 and 6 a rotational casting machine for producing the pump housing 10 includes a mold arm assembly 50. The assembly 50 includes a shaft 52 driven by a motor 54 about its longitudinal axis. The shaft 52 carries a mold mounting frame 56 which comprises frame members 58, 60, 62 and 64. The frame member 64 carries a shaft 66 which is provided at its ends with a sprocket 68 and a bevel gear 70. The sprocket 68, and therefore the shaft 66, are driven by a sprocket 72 mounted on a sleeve 74. The bevel gear 70 meshes with a bevel gear 75 to drive a shaft 76 which is fixed to a mounting plate 78 to rotate the mounting plate 78 about an axis x orthogonal to an axis Y of the shaft 52 and the sleeve 74. The mounting plate 78 is fixed to a mold frame 80 which, at its opposite end, carries a mounting plate 82 similar to the mounting plate 78. The mounting plate 82 is mounted in a bearing 84 carried by the member 62.

A rotational casting mold 86 is mounted between the mounting plates 78 and 82 by a plurality of bolts 88 which extend from the mounting plates 78 and 82 through the flanges 90 and 92 of metal mounting fittings 94. As may be seen in FIGS. 4 and 6, the mold 86 has a mold wall 96 which defines a mold cavity 98. The rotational casting operation forms a pump housing wall 100 which generally uniformly coats the interior of the mold wall 96.

With particular reference to FIG. 4, it will be noted that the flange 28 (and, as shown if FIG. 6, the flange 36) is thickened compared to the remainder of the wall 100. The thickened flange portion of the wall 100 is promoted by the sleeves 32 and by annular reinforcing plates 102 which also prevent warping of the flanges 28 and 36. The plates 102 mount the threaded sleeves 32 in a circular array.

The mold wall 96 is provided with a circular array of bolt openings 104 adjacent that portion of the mold wall which forms to underside of each flange 28 and 36. Prior to the casting operation, each plate 102 is mounted within the mold cavity 98, in spaced relationship to the wall 96, by bolts 106 which extend through the openings 104 and are threaded into the sleeves 32 to hold the sleeve ends against the mold wall 96.

During the casting operation, the sleeves 32 and the plates 102 are heated by conduction to accumulate the molding resin thereon, to thereby thicken the mold wall 100 in the region of the flanges 28 and 36. In a similar fashion a seal plate opening 108 is provided with a reinforcing plate 102 having sleeves 32.

After the molding operation is completed, the bolts 106 are removed and the pump housing 10 is removed from the mold. Machining operations are then performed to remove front sections 110 of the wall 100 to provide a flange sealing face 112 for a gasket or for the provision of an O-ring groove. As may be seen in FIG. 6, an annular portion 114 of the wall is removed to provide the lid 20. An O-ring groove 116 is machined in the upper edge of the basket housing 24 and the lid 20 is clamped on the housing 24 by a ring clamp 118.

As may be seen in FIG. 7, a rotationally cast tank liner 120 is formed by the present invention and includes a reinforced flange 122 having a reinforcing plate 124 and associated sleeves 126. The tank is helically wound by a resin impregnated reinforcing filament 128 such as glass.

The present disclosure describes several embodiments of the invention, however, the invention is not limited to these embodiments. Other variations are contemplated to be within the spirit and scope of the invention and appended claims.

What is claimed is:

1. A rotationally cast molded pump casing comprising a thermoplastic rotationally cast unitary casing wall having openings defining inlet and outlet ports, said wall defining an impeller housing and a strainer basket housing, each of said openings having an annular flange, each said flange having a flange face, each said annular flange having a plurality of bolt access openings therethrough defined by metallic tubular sleeves, and an annular metal plate embedded in and being covered by a portion of said wall defining each said annular flange and having apertures receiving said tubular sleeves, each sleeve extending through said wall and together with said plate providing reinforcement for said openings defining said inlet and outlet ports.

2. A rotationally cast molded pump casing according to claim 1 wherein said tubular sleeves are provided with internal threads.

* * * * *